United States Patent
Self et al.

(10) Patent No.: US 9,582,294 B1
(45) Date of Patent: Feb. 28, 2017

(54) APPARATUSES, METHODS, AND COMPUTER PROGRAM PRODUCTS FOR AUTOMATIC INTERNATIONALIZATION OF GRAMMATICAL OUTPUT

(71) Applicant: McKesson Financial Holdings, Hamilton (BM)

(72) Inventors: Bryan Self, Birmingham, AL (US); Preston Prewett, Sylvan Springs, AL (US); Josh Turner, Hueytown, AL (US)

(73) Assignee: McKesson Financial Holdings, Hamilton (BM)

( * ) Notice: Subject to any disclaimer, the term of this patent is extended or adjusted under 35 U.S.C. 154(b) by 0 days.

(21) Appl. No.: 14/836,481

(22) Filed: Aug. 26, 2015

(51) Int. Cl.
*G06F 9/44* (2006.01)
*G06F 9/45* (2006.01)

(52) U.S. Cl.
CPC .............. *G06F 9/4448* (2013.01); *G06F 8/42* (2013.01)

(58) Field of Classification Search
CPC ................................. G06F 9/4448; G06F 8/42
USPC ........................................................ 717/144
See application file for complete search history.

(56) References Cited

U.S. PATENT DOCUMENTS

| | | | | |
|---|---|---|---|---|
| 5,664,206 A * | 9/1997 | Murow | ................. | G06F 9/4448 704/5 |
| 5,678,039 A * | 10/1997 | Hinks | .................. | G06F 9/4448 |
| 6,275,978 B1 * | 8/2001 | Bell | ........................ | G06F 17/28 704/8 |
| 8,418,135 B2 * | 4/2013 | Proctor | .................. | G06N 5/022 717/117 |
| 2002/0107684 A1 * | 8/2002 | Gao | .......................... | G06F 8/51 704/4 |
| 2005/0138207 A1 * | 6/2005 | Chen | ..................... | G06F 9/4448 709/246 |
| 2008/0104580 A1 * | 5/2008 | Wilkinson | ............. | G06F 8/433 717/141 |
| 2011/0113327 A1 * | 5/2011 | Hagelund | ............ | G06F 9/4448 715/265 |
| 2012/0022851 A1 * | 1/2012 | Bremner | ............... | G06F 9/4448 704/3 |

(Continued)

OTHER PUBLICATIONS

Groovy, Release notes for Groovy 2.3 (Apr. 1, 2015) retrieved from https://web.archive.org/web/20150401235650/http://groovy-lang.org/releasenotes/groovy-2.3.html.*

(Continued)

*Primary Examiner* — Lewis A Bullock, Jr.
*Assistant Examiner* — Theodore Hebert
(74) *Attorney, Agent, or Firm* — Alston & Bird LLP

(57) ABSTRACT

Apparatuses, methods, and computer program products are provided for automatically internationalizing grammatical output for presentation to a user of a program based on the user's locale. In particular, AST transformations are described that cause a compiler to generate a programming method during compilation of a portion of source code containing a predefined token, where the programming method is incorporated (by the compiler) into a file produced by the compiler and serves to call an instance of a message bundle file that provides translation of grammatical output without requiring the programmer/developer to manually incorporate individual message bundles into each portion of source code to be internationalized.

20 Claims, 7 Drawing Sheets

(56) References Cited

U.S. PATENT DOCUMENTS

| | | | |
|---|---|---|---|
| 2013/0086424 A1* | 4/2013 | Smiljanic | G06F 11/3664 714/32 |
| 2013/0263086 A1* | 10/2013 | Carter | G06F 8/33 717/113 |
| 2014/0123116 A1* | 5/2014 | Smiljanic | G06F 11/3664 717/130 |
| 2014/0136180 A1* | 5/2014 | Little | G06F 17/289 704/2 |
| 2015/0242194 A1* | 8/2015 | Vargas | G06F 8/51 717/137 |

OTHER PUBLICATIONS

Hu, Joy of Groovy (Jun. 14, 2009) retrieved from http://joyofgroovy.blogspot.com/2009/06/java-internationalization-and.html.*

* cited by examiner

APPARATUSES, METHODS, AND COMPUTER PROGRAM PRODUCTS FOR AUTOMATIC INTERNATIONALIZATION OF GRAMMATICAL OUTPUT

BACKGROUND

In computer programming, internationalization (also known as National Language Support, Native Language Support, NLS, or i18n) is a term used to describe the adaptation of computer software to accommodate different languages and regional differences. The process of internationalization during software application design allows the software application to potentially be adapted to various languages and regions without necessarily requiring engineering changes.

At its most basic level, internationalization involves the translation of words and phrases—the grammatical output of a software application that is presented to the user on a display of an electronic device running the software application. Internationalization can involve more than just translation, however, as there can be various other differences in grammatical output from one locale to the next. Such differences can include differences in dialect or word choice (e.g., considering French spoken in France versus French spoken in Canada); formatting of numbers (punctuation, date formatting, etc.); visual presentation of text considering writing direction (left to right versus right to left); capitalization, punctuation, and/or pluralization rules; units of measurement; and so on.

Considering the amount of grammatical output that is generated for certain software applications, there is a need for a more efficient, less time consuming, and more easily manageable mechanism for internationalizing grammatical output, such as for software applications used in the healthcare industry.

BRIEF SUMMARY

Accordingly, improved apparatuses, methods, and computer program products for automatically internationalizing grammatical output are provided. In particular, Abstract Syntax Tree (AST) transformations are described that cause a compiler to generate a programming method during compilation of a portion of source code containing a predefined token, where the programming method is incorporated (by the compiler) into a file produced by the compiler and serves to call an instance of a message bundle file that provides translation of grammatical output without requiring the computer programmer/software developer to manually write, incorporate, and execute such programming methods for each portion of source code to be internationalized.

Accordingly, in some embodiments, an apparatus for automatically internationalizing grammatical output for presentation to a user of a program based on the user's locale is provided, where the apparatus comprises at least one processor and at least one memory including computer program code. The at least one memory and the computer program code may be configured to, with the processor, cause the apparatus to at least modify an Abstract Syntax Tree (AST) in response to compilation by a compiler of a predefined AST transformation and compile a portion of source code for generating grammatical output to a user of a program following compilation of the predefined AST transformation, wherein the portion of source code comprises a predefined token. A modified node of the AST may be referenced during compilation of the portion of source code in response to compiling the predefined token, and a programming method may be generated in response to referencing the modified node of the AST during compilation of the portion of source code. The programming method may be incorporated into a file produced by the compiler, where the programming method is configured to call an instance of a message bundle file, and where the message bundle file is configured to define an entry key value in a natural language based on a locale of the user.

In some embodiments, the at least one memory and the computer program code may be further configured to, with the processor, cause the apparatus to compile a second portion of source code for generating a grammatical output to a user of a different program following the compilation of the predefined AST transformation. Additionally or alternatively, the at least one memory and the computer program code may be further configured to, with the processor, cause the apparatus to further modify the AST in response to compilation by the compiler of a second predefined AST transformation.

In some cases, the AST transformation may be a Groovy AST transformation. The compiler may be a Groovy compiler, and the file into which the programming method is incorporated may be a class file. In some embodiments, the message bundle file may be configured to define an entry key value in any one of at least three natural languages comprising at least one of English, French, or Spanish. Moreover, the entry key value may be presented to a user as part of a user interface of a healthcare application.

In other embodiments, a method and a computer program product for automatically internationalizing grammatical output for presentation to a user of a program based on the user's locale are provided. The method and/or computer program product may include modifying an Abstract Syntax Tree (AST) in response to compilation by a compiler of a predefined AST transformation and compiling a portion of source code for generating grammatical output to a user of a program following compilation of the predefined AST transformation, wherein the portion of source code comprises a predefined token. The method and/or computer program product may further include referencing a modified node of the AST during compilation of the portion of source code in response to compiling the predefined token; generating a programming method in response to referencing the modified node of the AST during compilation of the portion of source code; and incorporating a programming method into a file produced by the compiler, where the programming method is configured to call an instance of a message bundle file, and where the message bundle file is configured to define an entry key value in a natural language based on a locale of the user.

In some embodiments, the method and/or computer program product may include compiling a second portion of source code for generating a grammatical output to a user of a different program following the compilation of the predefined AST transformation. Additionally or alternatively, the method and/or computer program product may further modify the AST in response to compilation by the compiler of a second predefined AST transformation.

In some cases, the AST transformation may be a Groovy AST transformation. The compiler may be a Groovy compiler, and the file into which the programming method is incorporated may be a class file. In some embodiments, the message bundle file may be configured to define an entry key value in any one of at least three natural languages comprising at least one of English, French, or Spanish. Moreover, the entry key value may be presented to a user as part of a user interface of a healthcare application.

BRIEF DESCRIPTION OF THE SEVERAL VIEWS OF THE DRAWINGS

Figure 1:
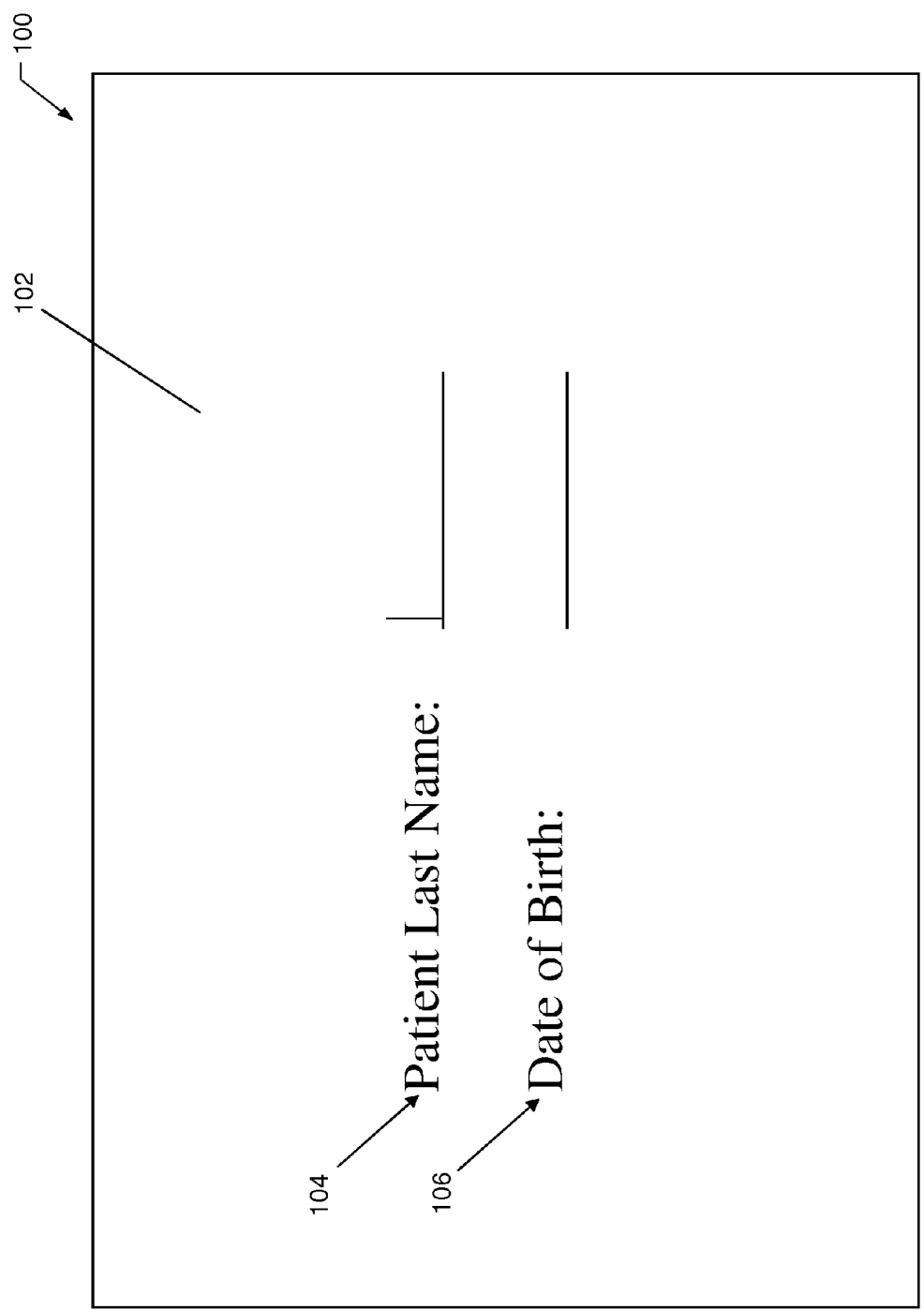
Figure 2:
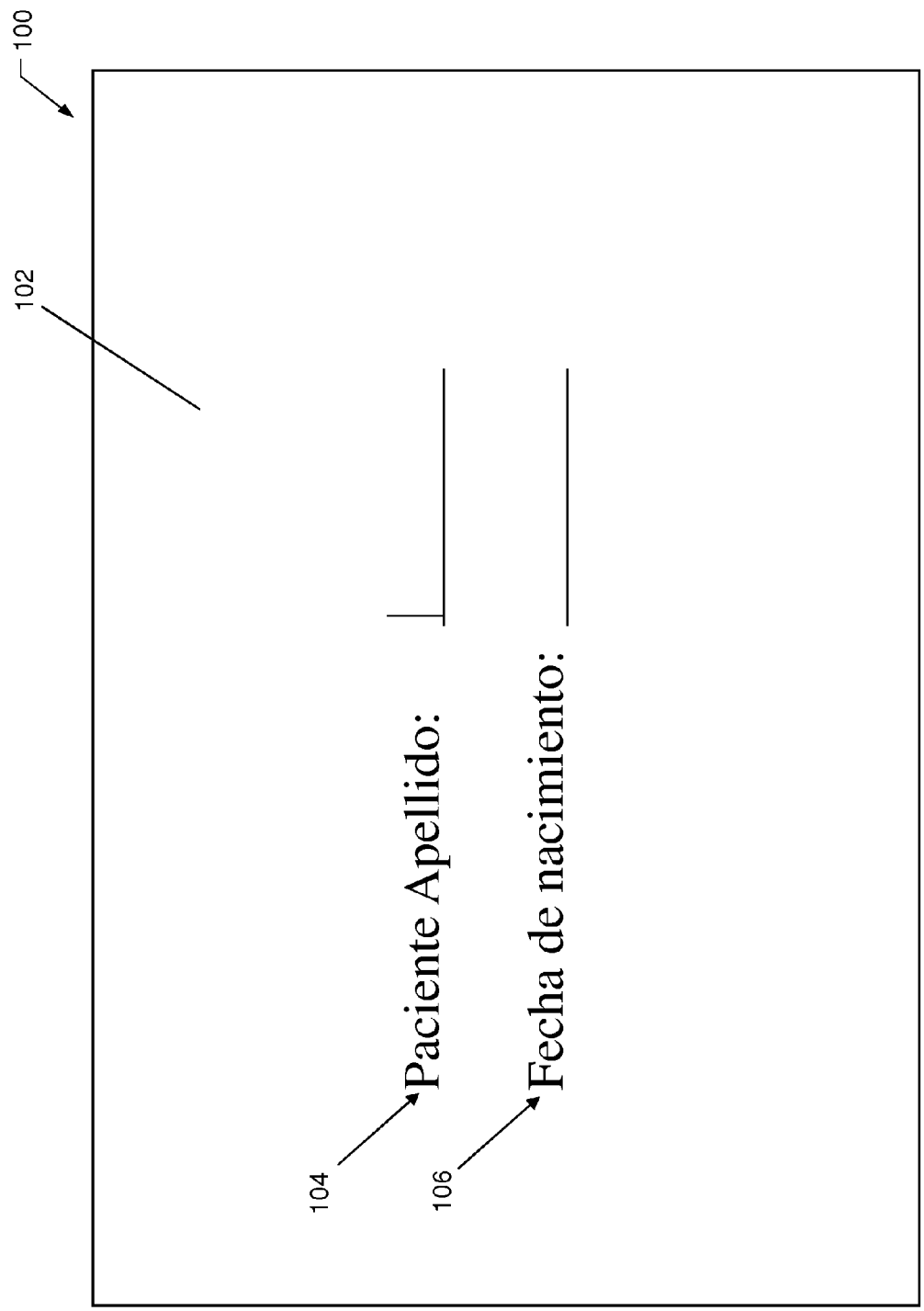
Figure 3:
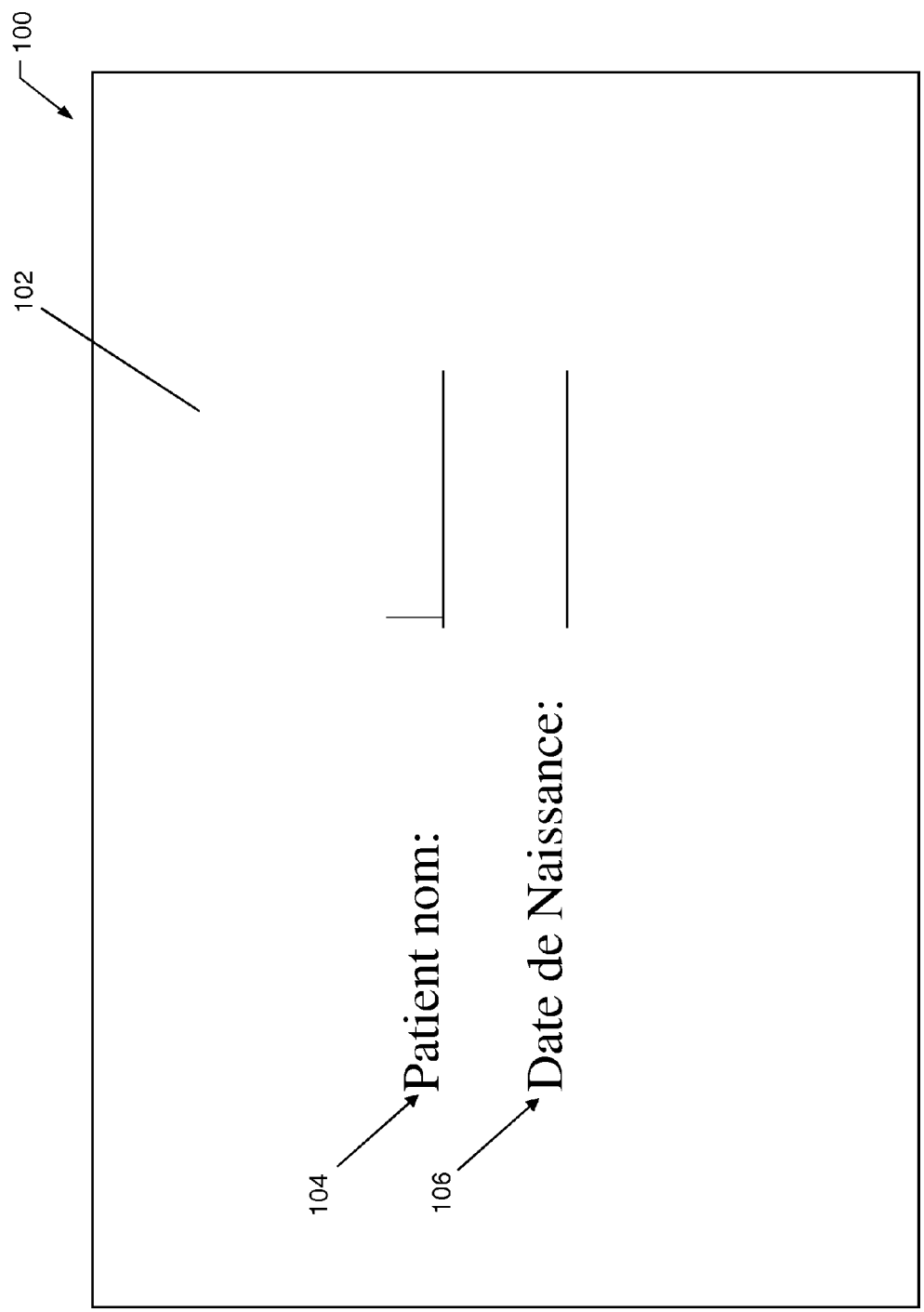
Figure 4:
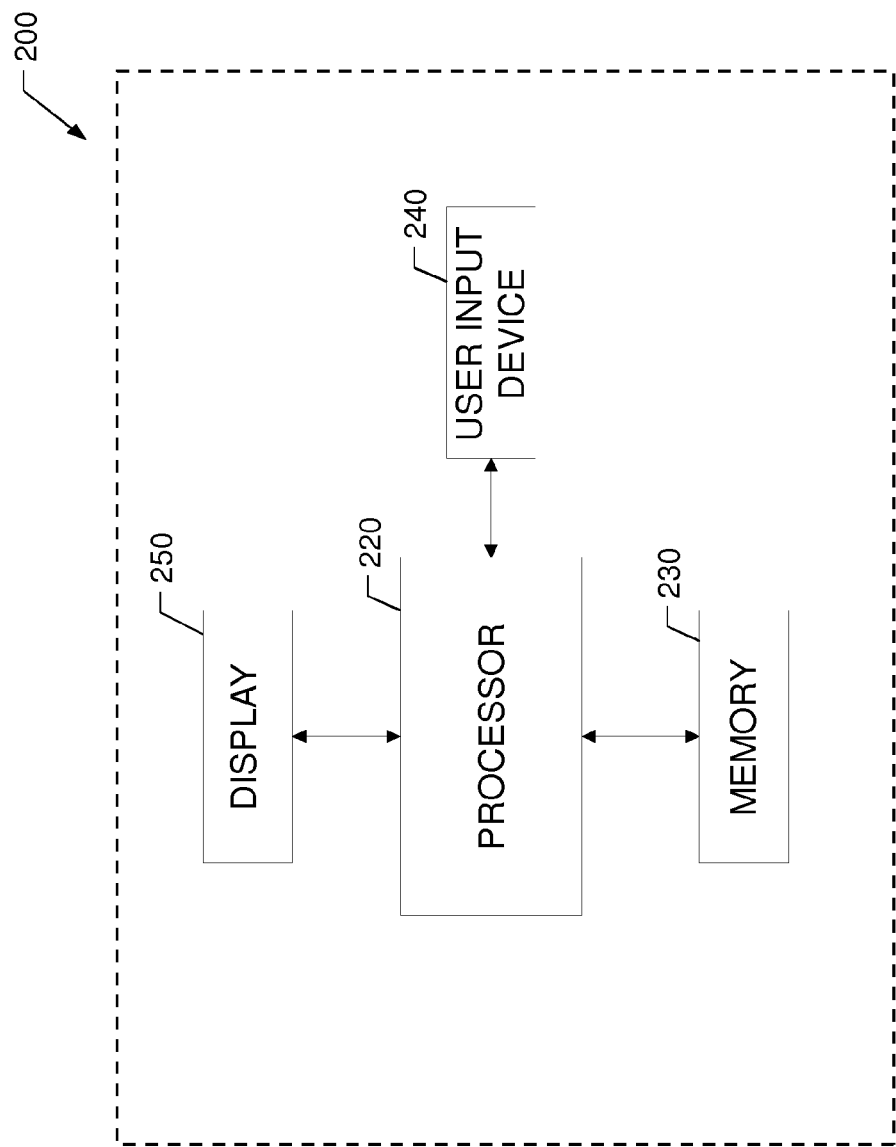
Figure 5:
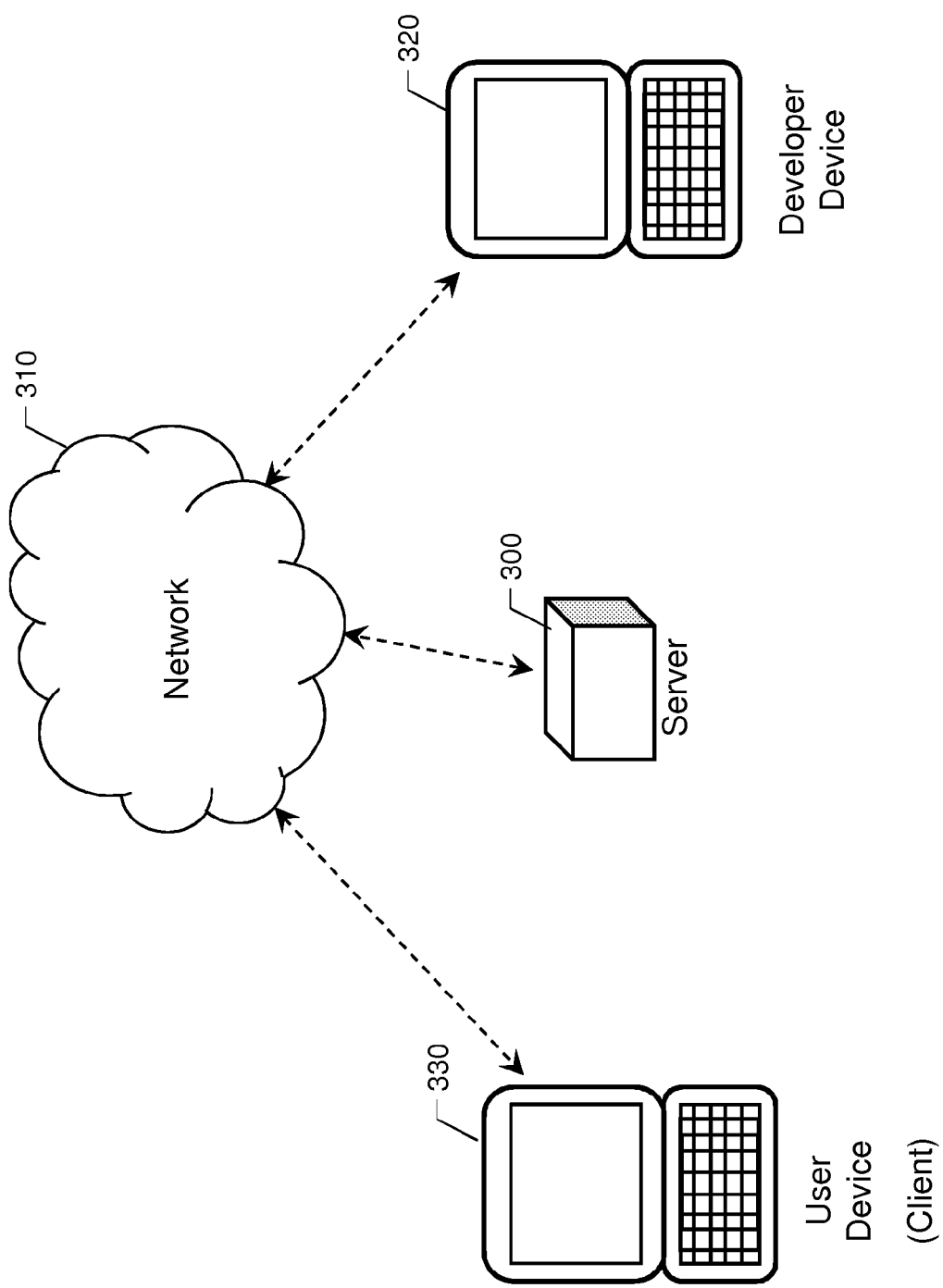
Figure 6:
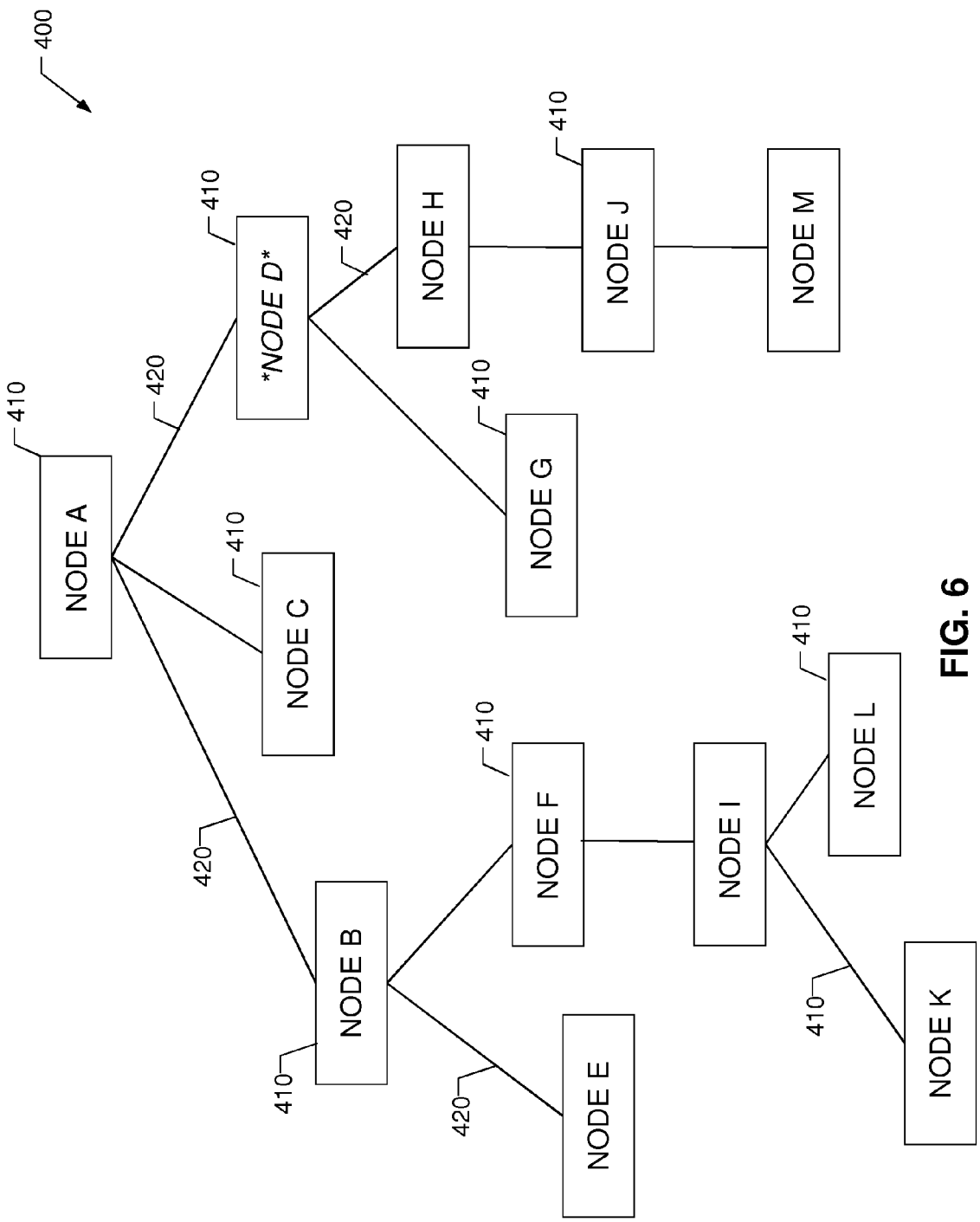
Figure 7:
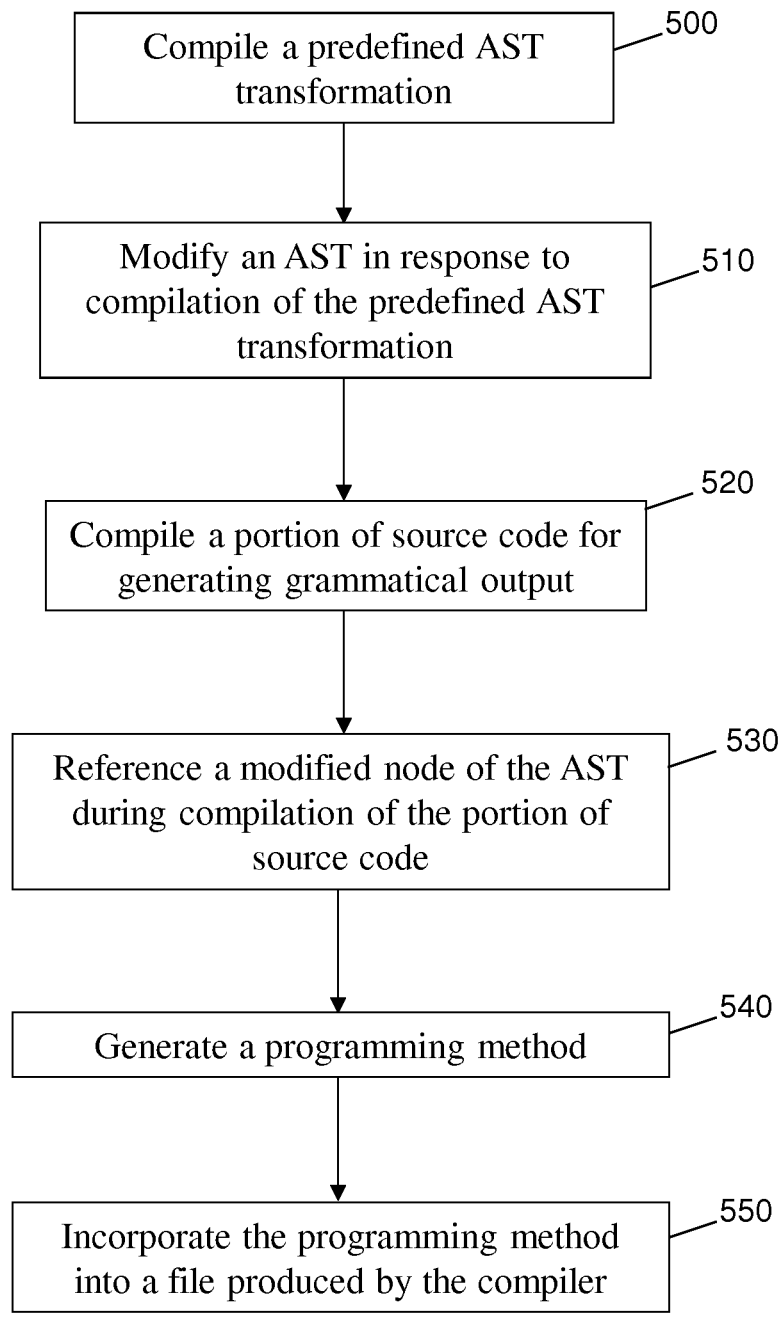

Having thus described the invention in general terms, reference will now be made to the accompanying drawings, which are not necessarily drawn to scale, and wherein:

FIGS. 1-3 illustrate a user interface generated by a software program, including grammatical output that is presented to a user of the program according to the user's locale;

FIG. 4 is a schematic representation of an apparatus in accordance with one example embodiment of the present invention;

FIG. 5 is a schematic representation of a system environment in which the apparatus of FIG. 4 may operate in accordance with one example embodiment of the present invention;

FIG. 6 illustrates an Abstract Syntax Tree (AST) in accordance with one example embodiment of the present invention; and FIG. 7 is a flow chart illustrating a method for automatically internationalizing grammatical output according to an example embodiment of the present invention.

DETAILED DESCRIPTION

Embodiments of the present invention now will be described more fully hereinafter with reference to the accompanying drawings, in which some, but not all embodiments of the invention are shown. Indeed, embodiments of this invention may be embodied in many different forms and should not be construed as limited to the embodiments set forth herein; rather, these embodiments are provided so that this disclosure will satisfy applicable legal requirements. Like reference numerals refer to like elements throughout.

Although the description that follows may include examples in which embodiments of the invention are used in the context of healthcare organizations, such as hospitals and pharmacies, it is understood that embodiments of the invention may be applied to software applications used in numerous settings, including in other types of healthcare organizations and in organizations outside the field of healthcare. Moreover, embodiments of the invention may be used for the internationalization of software applications used by individual users outside the context of an organization, such as for personal or residential use.

In general, a software application is a software program (e.g., executable software consisting of compiled code that can run directly from a computer's operating system) that provides a specific group of functions to the user. For example, a word processing application is a software program that is designed with functionality that allows a user to create a written document. As another example, an email application is a software program that is designed with functionality that allows a user to receive, read, and store emails, reply to received emails, and draft and send new emails. In the context of an organization, such as a healthcare organization (e.g., a hospital, pharmacy, clinic, etc.), an educational institution (e.g., a university), or a business (e.g., a corporation), applications may be used to enable or facilitate the daily work activities of members of the organization. In a hospital setting, for example, an application may be used by the medical staff (doctors, nurses, technicians, pharmacists, etc.) to access patient medical histories, enter orders for medications to be administered to the patients, record the time, dosage, etc. of medication administered to a patient, schedule appointments, record insurance and billing information, enter notes, etc.

To enable user interaction and provide data to the user, most software applications produce grammatical output, such as in the form of audible output (e.g., via speakers of an electronic device) or textual output (e.g., via a display presenting a graphical user interface, or GUI). For example, a screen 100 may be presented on a display 102 of an electronic device, such as on a computer monitor or a laptop display, that provides a prompt to the user to enter a patient's last name 104 and provide the patient's date of birth 106, as shown in FIG. 1. This information may then be used by the system to access a medical record or medical history associated with the patient information that was entered from a database or other repository of information.

Depending on the user's locale where the software application is used, the information provided on the display 102 may be presented in different natural (e.g., human-readable) languages. For example, the user of the system shown in FIG. 1 may be located in the United States of America and, thus, it may be most appropriate to provide the prompts 104, 106 in the English language. In FIGS. 2 and 3, however, the user may be located in Mexico and Canada, respectively, and as such the prompts 104, 106 may be provided in Spanish and French, respectively.

In conventional computer programming, internationalization to allow grammatical output, such as the prompts 104, 106 of FIGS. 1-3, to be displayed in a natural language appropriate to the user's locale is generally accomplished using message bundles. A message bundle is a file that contains statements or sentences that have been translated into multiple languages. The message bundle may, for example, be an xml file that is included in one or more classes in the source code.

For example, a message bundle for providing the first prompt 104 of FIGS. 1-3 may be provided as follows:

<entry key="misc.patient name">
  <usage/>
  <value lang="en_US">Patient Name</value>
  <value lang="de_DE">Patientenname</value>
  <value lang="es_MX">Paciente Apellido</value>
  <value lang="fr_FR">Patient Nom</value>
  <value lang="fr_CA">Patient Nom</value>
</entry>

Typically, a message bundle must be manually written by a software program developer for each statement or sentence that is to be presented on the display. For software applications with large amounts of data to present, numerous message bundles must be created and included in the source code to allow the appropriate statements (in the correct natural language) to be presented based on the user's locale. In other words, each screen of the user interface of the software application will have source code that includes one or more message bundles for enabling locale-specific statements to be presented to the user.

In addition to the tedious nature of writing each message bundle to represent multiple translations of a statement for each occurrence of that statement in the presentation of the software application, any changes to a part of the software application (e.g., an update to a particular screen or set of screens provided by the application) would require corresponding changes to the message bundles involved with presentation of those screens. Thus, along with the laborious and time-intensive nature of creating and maintaining the various message bundles comes the risk that one or more of the message bundles may be missed during the update and/or that inconsistent translations, spellings, etc. may be used in message bundles in different portions of the source code.

Accordingly, embodiments of an apparatus, method, and computer program product are described herein that provide for the automatic internationalization of grammatical output for presentation using AST transformations that cause a compiler to generate a programming method (e.g., a procedure associated with an object class of the source code that represents behavior of the object) for calling a message bundle file. The automatic generation and insertion of the programming method by the compiler eliminates the need for a program developer to manually include message bundles in the source code corresponding to every statement that needs to be internationalized for presentation on a user interface by automatically directing the access of the appropriate message bundle to return the particular translation based on the user's locale.

With reference now to FIG. 4, an apparatus 200 is illustrated for automatically internationalizing grammatical output for presentation to a user of a program based on the user's locale. The apparatus 200 may, in some embodiments, be a computer (e.g., a desktop computer, laptop computer, server, etc.) or other user device that includes hardware and software configured for modifying an AST, compiling AST transformations and/or source code, and generating programming methods for incorporation into an output file, as described in greater detail below. In other embodiments, the apparatus 200 may be embodied as a chip or chip set. In other words, the apparatus 200 may comprise one or more physical packages (e.g., chips) including materials, components and/or wires on a structural assembly (e.g., a baseboard). The apparatus 200 may therefore, in some cases, be configured to implement an embodiment of the present invention on a single chip or as a single "system on a chip."

In some embodiments, the apparatus 200 may comprise at least one processor 220, which may be embodied in a number of different ways. For example, the processor 220 may be a coprocessor, a microprocessor, a controller, or various other processing circuitry including integrated circuits. In some embodiments, the processor 220 may include one or more processing cores configured to perform independently. Additionally or alternatively, the processor 220 may include one or more processors configured in tandem via a bus to enable independent execution of instructions, pipelining and/or multithreading. Accordingly, although illustrated in FIG. 4 as a single processor, in some embodiments the processor 220 comprises a plurality of processors. The plurality of processors may be embodied on a single computing device or distributed across a plurality of computing devices. The plurality of processors may be in operative communication with each other and may be collectively configured to perform one or more functionalities as described herein.

The apparatus 200 may further comprise at least one memory 230, and the processor 220 may be configured to execute instructions stored in the memory 230 or that are otherwise accessible to the processor. In embodiments in which the processor is embodied as an executor of software instructions, the instructions may specifically configure the processor to perform the algorithms and/or operations described herein when the instructions are executed. The memory 230, which may include volatile memory, such as volatile Random Access Memory (RAM) and/or non-volatile memory, may store any of a number of pieces of information and data, including software programs, libraries, databases, applications, repositories of data, files, etc. that are used by the apparatus 200 to implement the functions described herein. Although illustrated in FIG. 4 as a single memory, the memory 230 may comprise a plurality of memories, which may be embodied on a single computing device or distributed across a plurality of computing devices.

With continued reference to FIG. 4, the apparatus 200 may further include or be in communication with a user input device 240 and a display 250. The user input device 240 may be one or more of a keyboard, mouse, touchpad, touchscreen, etc., that is configured to receive input from a user and convey the input to the processor 220. The display 250 may be any computer output surface and/or projecting mechanism that is configured to show text (e.g., grammatical output) and/or graphic images to the user, such as via cathode ray tube (CRT), liquid crystal display (LCD), light-emitting diode, gas plasma, or other image projection technology.

Referring to FIG. 5, for example, the apparatus 200 of FIG. 4 may, in some cases, be embodied by a server 300 that is in communication with one or more devices via a network 310. In the depicted embodiment, the devices include a developer device 320 and a user device 330. In this regard, the developer device 320 may be a computer used by a software program developer to write source code, such as source code for a software application and/or AST transformations. The developer may compile the source code via communication with the server 300, which may include memory (e.g., the memory 230 shown in FIG. 4) on which software is stored for compiling source code that is written by the developer in a high-level programming language to convert it to a lower level programming language.

As an example, in the case of a Java compiler (e.g., a compiler for the Java programming language), the output may be a Java class file. In the case of a Groovy compiler (e.g., a compiler for the Groovy programming language that can be used as a scripting language for the Java platform), the output may be Java Virtual Machine (JVM) bytecode.

The output may then be used to create an executable program, such as a software application for a healthcare provider or other organization. That executable program may be accessed from the server 300 by a user via a user device 330 at a client site (e.g., a pharmacy technician at a hospital), and the software application may run on the user device 330 or may otherwise generate a user interface that is presented on the user device such that the user is able to view and interact with data presented at the user device. In this regard, the user device 330 may be a computer, such as a laptop or a desktop computer, a tablet computer, or any other computing device that a user can interact with to access, view, and manipulate data provided by the software application. For example, the user may, in some cases, access the software application through communication between the user device and the server 300 over the Internet or an intranet, such as via a webpage interface. Accordingly, as described herein, depending on the locale of the user (e.g., where the client site is located), embodiments of the invention allow the information presented to the user via the user device 330 to be provided in the correct language, format, etc.

In particular, in some embodiments, the apparatus 200 for automatically internationalizing grammatical output comprises at least one processor 220 and at least one memory 230 including computer program code, as shown in FIG. 4. The at least one memory 230 and the computer program code may be configured to, with the processor 220, cause the apparatus 200 to modify an AST in response to compilation by a compiler of a predefined AST transformation.

A schematic representation of an AST 400 is provided in FIG. 6. In this regard, the AST may be a tree representation of the abstract syntactic structure of source code that includes nodes 410 and branches 420 and is built by a parser (for example) during source code translation and compilation. The compiler (e.g., embodied by the server 300 of FIG. 5) may reference various nodes of the AST 400 when compiling the source code, such as during a semantic analysis stage of compilation, to determine whether the source code is syntactically correct before advancing to subsequent stages of compiling the source code. Each node 410 of the AST 400 may hold different information, such as constant names, variable names, assignment operations, generic expressions, etc.

As noted above, the at least one memory and the computer program code may be configured to, with the processor, cause the apparatus to at least modify an AST in response to compilation by a compiler of a predefined AST transformation. In this regard, the AST transformation may be a portion of code (e.g., written in the Groovy programming language) that is configured to customize the AST before the compiler references the AST to compile the source code for the software program. The AST transformation may be predefined in that it is written or otherwise created or obtained by the developer prior to compilation of the source code for the software program. After the AST transformation is compiled, it may be added to the class path of the compiler. As a result, the AST representing the software program source code being compiled may be modified, such as by modifying a node 410 of the AST. For example, the AST transformation may result in Node D of the AST being modified (represented in FIG. 6 using asterisks).

Following compilation of the predefined AST transformation (e.g., after the AST has been modified), a portion of source code for generating grammatical output to a user of a program may be compiled. That portion of source code may include a predefined token, or annotation in some cases, and compilation of the predefined token may result in the modified node of the AST being referenced during compilation of the portion of source code including that predefined token. For example, an annotation called @MsgBundle may be included in the source code (e.g., at the top of a class), and each time the compiler comes across this annotation in the portion of source being compiled, the compiler may reference the modified node 410 of the AST 400 (e.g., Node D).

In some embodiments, that modified node 410 (e.g., Node D) may (as a result of the modification) now include instructions for a programming method to be generated and incorporated into the file produced by the compiler. In other words, a programming method may be generated in response to referencing the modified node of the AST during compilation of the portion of source code that included the token, and that programming method may be incorporated into a file produced by the compiler. In the case of a Java compiler, for example, the programming method may be written into the bytecode forming the output of the Java compiler, such as in a particular class file. This programming method may be configured to call an instance of a message bundle file from anywhere inside the class in which the programming method has been inserted, and the message bundle file may be configured to define an entry key value in a natural language based on a locale of the user. The entry key value may thus be presented to a user (in the appropriate language and/or format) as part of a software application's user interface, such as the user interface of a healthcare application, as described above and shown in FIGS. 1-3. In this way, translation of grammatical output presented on the user interface may be accomplished without requiring the program developer to manually incorporate individual message bundles into each portion of source code to be internationalized. In other words, in contrast with conventional methods in which a developer would have to write the code to manually translate the message bundle in each spot of the source code, embodiments of the invention described herein are automating the coding of translating the message bundle in each spot of source code.

In essence, the AST transformation ends up causing the compiler to autonomously (e.g., without the direct intervention of the developer) write the tedious source code that obtains the message bundle instance and interacts with it to effect the appropriate internationalization of the portion of source code involved. Accordingly, when a message bundle key (e.g., "misc.patient name" in the example above) is fed to the programming method that has been automatically incorporated into the class (by the compiler), the programming method will return the appropriate translation for "misc.patient name" based on the user's locale using the appropriate message bundle. In some embodiments, for example, the message bundle file may be configured to define an entry key value in any one of at least three natural languages, including English, French, and/or Spanish.

In some embodiments, the at least one memory and the computer program code may be further configured to, with the processor, cause the apparatus to compile a second portion of source code for generating a grammatical output to a user of a different program following the compilation of the predefined AST transformation. For example, if the software program the user will be accessing and interacting with needs to be changed (e.g., updated to a new version or otherwise modified to add or change features of the program), the source code corresponding to the new (e.g., updated) program may be compiled, and the modified node of the AST (due to the original, previously compiled AST transformation) may again be referenced during compilation of this second portion of source code to effect automatic internationalization of the program as needed.

Similarly, in some cases, the at least one memory and the computer program code may be further configured to, with the processor, cause the apparatus to further modify the AST in response to compilation by the compiler of a second predefined AST transformation. For example, if the developer wishes to incorporate new programming methods, e.g., calling on additional message bundles or implementing other processes, a second predefined AST transformation may be compiled, resulting in a further modification of the AST. Thus, an additional or different node of the AST may be modified, or further modifications may be made to the previously modified node, as a result of compilation of the second predefined AST transformation.

Referring now to FIG. 7, embodiments of a method for automatically internationalizing grammatical output for presentation to a user of a program based on the user's locale are provided. According to embodiments of the method, an AST may be modified at Block 510 in response to compilation by a compiler of a predefined AST transformation at Block 500. A portion of source code for generating grammatical output to a user of a program may be compiled following compilation of the predefined AST transformation at Block 520, where the portion of source code comprises a predefined token as described above. A modified node of the AST may be referenced during compilation of the portion of source code in response to compiling the predefined token at Block 530, and a programming method may be generated at Block 540 in response to referencing the modified node of the AST during compilation of the portion of source code. The programming method may be incorporated into a file produced by the compiler at Block 550. As described above, the method may be configured to call an instance of a message bundle file, and the message bundle file may be configured to define an entry key value in a natural language based on a locale of the user. In this way, the user may be presented with grammatical output, e.g., textual prompts displayed on the user's screens, in the appropriate language, format, etc. according to the location of the user (e.g., the country or region that the user is located).

In some embodiments, a second portion of source code for generating a grammatical output to a user of a different program may be compiled following the compilation of the predefined AST transformation. Additionally or alternatively, the AST may be further modified in response to compilation by the compiler of a second predefined AST transformation.

Example embodiments of the present invention have been described above with reference to block diagrams and flowchart illustrations of methods, apparatuses, and computer program products. In some embodiments, certain ones of the operations above may be modified or further amplified as described below. Furthermore, in some embodiments, additional optional operations may be included. Modifications, additions, or amplifications to the operations above may be performed in any order and in any combination.

It will be understood that each operation, action, step and/or other types of functions shown in the diagram (FIG. 7), and/or combinations of functions in the diagram, can be implemented by various means. Means for implementing the functions of the flow diagram, combinations of the actions in the diagrams, and/or other functionality of example embodiments of the present invention described herein, may include hardware and/or a computer program product including a non-transitory computer-readable storage medium (as opposed to or in addition to a computer-readable transmission medium) having one or more computer program code instructions, program instructions, or executable computer-readable program code instructions stored therein.

For example, program code instructions associated with FIG. 7 may be stored on one or more storage devices, such as a memory 230 of the apparatus 200, and executed by one or more processors, such as processor 220, shown in FIG. 4. Additionally or alternatively, one or more of the program code instructions discussed herein may be stored and/or performed by distributed components, such as those discussed in connection with the apparatus 200. As will be appreciated, any such program code instructions may be loaded onto computers, processors, other programmable apparatuses or network thereof from one or more computer-readable storage mediums to produce a particular machine, such that the particular machine becomes a means for implementing the functions of the actions discussed in connection with, e.g., FIG. 7 and/or the other drawings discussed herein. As such, FIG. 7 showing data flows may likewise represent program code instructions that may be loaded onto a computer, processor, other programmable apparatus or network thereof to produce a particular machine.

The program code instructions stored on the programmable apparatus may also be stored in a non-transitory computer-readable storage medium that can direct a computer, a processor (such as processor 220) and/or other programmable apparatus to function in a particular manner to thereby generate a particular article of manufacture. The article of manufacture becomes a means for implementing the functions of the actions discussed in connection with, e.g., FIG. 7. The program code instructions may be retrieved from a computer-readable storage medium and loaded into a computer, processor, or other programmable apparatus to configure the computer, processor, or other programmable apparatus to execute actions to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel by one or more machines, such that multiple instructions are retrieved, loaded, and/or executed together. Execution of the program code instructions may produce a computer-implemented process such that the instructions executed by the computer, processor, other programmable apparatus, or network thereof provides actions for implementing the functions specified in the actions discussed in connection with, e.g., the process illustrated in FIG. 7.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for automatically internationalizing grammatical output for presentation to a user of a program based on the user's locale, the apparatus comprising at least one processor and at least one memory including computer program code, the at least one memory and the computer program code configured to, with the at least one processor, cause the apparatus to at least:

modify an Abstract Syntax Tree (AST) in response to compilation by a compiler of a predefined AST transformation;

compile a portion of source code, wherein the portion of source code is configured for generating grammatical output to the user of a program following compilation of the predefined AST transformation, wherein the portion of source code comprises a predefined token;

reference a modified node of the AST during compilation of the portion of source code in response to compiling the predefined token;

generate a programming method in response to referencing the modified node of the AST during compilation of the portion of source code;

incorporate the programming method into a file produced by the compiler, wherein the programming method is configured to call an instance of a message bundle file, and wherein the message bundle file is configured to define an entry key value in a natural language, wherein the natural language is based on a locale of the user.

2. The apparatus of claim 1, wherein the at least one memory and the computer program code are further configured to, with the at least one processor, cause the apparatus to compile a second portion of source code for generating a grammatical output to a user of a different program following the compilation of the predefined AST transformation.

3. The apparatus of claim 1, wherein the at least one memory and the computer program code are further configured to, with the at least one processor, cause the apparatus to further modify the AST in response to compilation by the compiler of a second predefined AST transformation.

4. The apparatus of claim 1, wherein the AST transformation is written using Groovy programming language.

5. The apparatus of claim 1, wherein the file into which the programming method is incorporated is a class file.

6. The apparatus of claim 1, wherein the compiler is a compiler for Groovy programming language.

7. The apparatus of claim 1, wherein the message bundle file is configured to define an entry key value in any one of at least three natural languages comprising at least one of English, French, or Spanish.

8. The apparatus of claim 1, wherein the entry key value is presented to the user as part of a user interface of a healthcare application.

9. A method for automatically internationalizing grammatical output for presentation to a user of a program based on the user's locale, the method comprising:
    modifying an Abstract Syntax Tree (AST) in response to compilation by a compiler of a predefined AST transformation;
    compiling a portion of source code, wherein the portion of source code is configured for generating grammatical output to the user of a program following compilation of the predefined AST transformation, wherein the portion of source code comprises a predefined token;
    referencing a modified node of the AST during compilation of the portion of source code in response to compiling the predefined token;
    generating a programming method in response to referencing the modified node of the AST during compilation of the portion of source code;
    incorporating the programming method into a file produced by the compiler,
    wherein the programming method is configured to call an instance of a message bundle file, and
    wherein the message bundle file is configured to define an entry key value in a natural language, wherein the natural language is based on a locale of the user.

10. The method of claim 9 further comprising compiling a second portion of source code for generating a grammatical output to a user of a different program following the compilation of the predefined AST transformation.

11. The method of claim 9 further comprising further modifying the AST in response to compilation by the compiler of a second predefined AST transformation.

12. The method of claim 9, wherein the AST transformation is written using Groovy programming language.

13. The method of claim 9, wherein the file into which the programming method is incorporated is a class file.

14. The method of claim 9, wherein the entry key value is presented to the user as part of a user interface of a healthcare application.

15. A computer program product comprising at least one non-transitory computer-readable storage medium having computer-executable program code portions stored therein, the computer-executable program code portions comprising program code instructions for:
    modifying an Abstract Syntax Tree (AST) in response to compilation by a compiler of a predefined AST transformation;
    compiling a portion of source code, wherein the portion of source code is configured for generating grammatical output to a user of a program following compilation of the predefined AST transformation, wherein the portion of source code comprises a predefined token;
    referencing a modified node of the AST during compilation of the portion of source code in response to compiling the predefined token;
    generating a programming method in response to referencing the modified node of the AST during compilation of the portion of source code;
    incorporating the programming method into a file produced by the compiler,
    wherein the programming method is configured to call an instance of a message bundle file, and
    wherein the message bundle file is configured to define an entry key value in a natural language, wherein the natural language is based on a locale of the user.

16. The computer program product of claim 15 further comprising program code portions for compiling a second portion of source code for generating a grammatical output to a user of a different program following the compilation of the predefined AST transformation.

17. The computer program product of claim 15 further comprising program code portions for further modifying the AST in response to compilation by the compiler of a second predefined AST transformation.

18. The computer program product of claim 15, wherein the AST transformation is written using Groovy programming language.

19. The computer program product of claim 15, wherein the file into which the programming method is incorporated is a class file.

20. The computer program product of claim 15, wherein the entry key value is presented to the user as part of a user interface of a healthcare application.

* * * * *